United States Patent

Bayer et al.

[11] Patent Number: 5,900,286
[45] Date of Patent: May 4, 1999

[54] METHOD OF PRODUCING AN ATTENUATING STRUCTURE ON A SURFACE WAVE COMPONENT

[75] Inventors: Heiner Bayer, Olching; Walter Fischer, Rosenheim; Winfried Plundrich, Germering; Hans Stelzl, Vaterstetten; Wolfgang Pahl, München, all of Germany

[73] Assignee: Siemens Aktiengesellschaft, Munich, Germany

[21] Appl. No.: 08/849,465

[22] PCT Filed: Dec. 5, 1996

[86] PCT No.: PCT/DE95/01738

§ 371 Date: Jun. 5, 1997

§ 102(e) Date: Jun. 5, 1997

[87] PCT Pub. No.: WO96/18182

PCT Pub. Date: Jun. 13, 1996

[30] Foreign Application Priority Data

Dec. 9, 1994 [DE] Germany .............................. 44 43 946

[51] Int. Cl.⁶ .................................. C08F 2/48; H03H 3/08
[52] U.S. Cl. .......................... 427/510; 333/195; 310/326; 427/493; 427/518; 522/170
[58] Field of Search ..................................... 333/193–196; 310/313 R, 313 B, 313 C, 313 D, 312, 326; 427/558, 559, 290, 386, 493, 510, 518; 29/25, 35; 522/170

[56] References Cited

U.S. PATENT DOCUMENTS

| 4,427,515 | 1/1984 | Yuhara et al. | 204/192 E |
| 4,510,410 | 4/1985 | Yuhara et al. | 333/194 X |
| 4,977,199 | 12/1990 | Koleske et al. | 522/31 |
| 5,242,715 | 9/1993 | Schoen et al. | 427/386 |
| 5,328,940 | 7/1994 | Zimmer | 522/31 |

FOREIGN PATENT DOCUMENTS

| 0 098 599 A2 | 1/1984 | European Pat. Off. . | |
| 0 262 414 | 4/1988 | European Pat. Off. . | |
| 0 360 037 A2 | 3/1990 | European Pat. Off. . | |
| 0 605 361 A2 | 7/1994 | European Pat. Off. . | |
| 59-210715 | 11/1984 | Japan | 333/194 |
| 2-104011 | 4/1990 | Japan | 333/194 |
| WO 83/02204 | 6/1983 | WIPO . | |

Primary Examiner—Robert Pascal
Assistant Examiner—Barbara Summons
Attorney, Agent, or Firm—Hill & Simpson

[57] ABSTRACT

An attenuating structure composed of an epoxy resin which cationically cures with UV initiation is proposed for a surface wave component. The solvent-free epoxy resin is based on a cycloaliphatic epoxide and is applied to the wafer by screen printing. When the wafers are sawn up, sawing through can be carried out without detaching or splintering off the attenuating material. Attenuation and corrosion behavior of the attenuating structures fulfill the requirements for surface wave filters.

11 Claims, 1 Drawing Sheet

METHOD OF PRODUCING AN ATTENUATING STRUCTURE ON A SURFACE WAVE COMPONENT

The present application has been nationalized from International application PCT/DE95/01738.

BACKGROUND OF THE INVENTION

Surface wave components, such as, for example, surface wave filters, are electronic components which are used for the signal processing of electromagnetic waves having an information content. In the case of the components used, for example, in radar systems, television sets and video recorders, the electrical pulse or current carrying the signal or the information is converted into mechanical vibrations, so-called surface waves. The acoustic properties of the transducer are influenced by a suitable construction of said transducer, especially by a particular geometrical configuration of the sound-generating transducer surface. As a result, it is possible to modify the acoustic signal in a desired way. For example, the intermediate frequency of approximately 38 MHz is filtered out of the total spectrum of a television or video signal in this way. Surface waves which are not completely converted back into electrical signals again disturb the operation of a surface wave component, as do reflections at component edges or other structures. To attenuate such undesirable surface waves and to reduce edge reflections and echo effects, the surface of the transducer element is predominantly provided in the region of the component edges with an attenuating mass which absorbs the energy of the diverging waves and reduces reflections and echo effects.

Organic materials having a very particular dynamic and mechanical property profile are required to produce such attenuating structures. European reference EP 0 360 037 proposes for this purpose, for example, to use two-component resins which have an epoxide base and which are crosslinkable by base catalysis with carbonic acids and acidic esters. Said two-component resins can be acoustically matched in a desired way and result in the required attenuation, but on the other hand, they present problems in processing. The mixing of the two resin components results in an increased expenditure in the manufacture, resins with limited pot life being obtained. The solvent content of the reactive resins requires a prolonged evaporation and curing procedure in which there is, in addition, the risk that the attenuating structures printed on in a special three-dimensional geometry flow and then no longer have the desired attenuating properties.

European reference EP 0 098 599 A2 proposes using UV-curing acrylic resin mixtures for the attenuating structures of surface wave components and optimizing said mixtures for a high modulus of elasticity and a high density. However, attenuating structures produced and cured in this way exhibit in practice an unduly high brittleness and an unduly low bonding to chip material and transducer material. The structures are produced on a wafer and then separated by sawing. The sawing of attenuating structures required in this process may result in their peeling off and detachment and, consequently, in damage to the entire component.

SUMMARY OF THE INVENTION

The object of the present invention is therefore to provide a surface wave component having an acoustically modified attenuating structure which can be produced simply and reliably, which has a low edge reflection and which has a high attenuation for stray signals.

In the invention, a conventional piezoelectric transducer is combined with a novel acoustic attenuating structure which advantageously results in a surface wave component having improved properties. The piezoelectric transducer, which is known per se, essentially comprises a substrate composed of piezoelectric material and transducer electrodes on one surface of the substrate. The transducer electrodes may comprise transmitting and receiving electrodes which are separated from one another by a propagation path for the surface waves. Acoustic attenuating structures are applied to this surface in such a way that transducer electrodes are only partly covered by them and propagation paths are not covered by them.

Since both the outline of the area covered by the attenuating structures and the attenuating structures themselves have to be specially shaped in cross section, a printing method, such as, for example, screen printing, is particularly suitable for applying the attenuating structures. The attenuating structures composed according to the invention of an epoxy resin which cationically cures with UV initiation are particularly well suited for processing by screen printing. The attenuating structures according to the invention can therefore be produced precisely in the desired geometrical construction. Accordingly, the surface wave component also has a very good acoustic attenuation. Interference signals bare attenuated by approximately 55 dB with respect to the main signal. The reflection behavior is very good so that virtually no edge reflections occur. The attenuating structures, which can be reliably applied, exhibit a very good bonding to the substrate, for example to a piezoceramic. This bonding also remains intact during the entire production process, which includes a sawing of the piezoceramic wafer in order to separate the components, the saw cut being passed through attenuating structures of the cured epoxy resin which have been applied over fairly large areas. The production of the surface wave component, which production can be carried out simply and reliably as a result of the easy processability of the epoxy resin, also makes said surface wave element inexpensive.

The attenuating structures, or the cured epoxy resin, have a glass transition temperature of more than 120° C. with the result that the component has a high climatic resistance and, consequently, operation is possible without unacceptable variation in the acoustic properties.

The epoxy resins which are used according to the invention for the attenuating structures and which cationically cure with UV initiation are available in electronic quality. This means that corrosion-promoting substances which could result in corrosion of the transducer structures during the service life of the component are not contained in the resin or are contained only in small amounts.

The method for producing the acoustic attenuating structures comprises the following steps:
- printing an epoxy resin which cationically cures with UV initiation in the desired structure on the surface of the surface wave component,
- optionally maintaining a holding time of up to 60 minutes and
- curing by exposing the resin structure to UV radiation.

An epoxy resin which is based on a cycloaliphatic epoxide is used for the method. To establish the desired processability by, in particular, screen printing, the cycloaliphatic epoxide is blended with a more highly viscous reaction product which is obtained by reacting precisely said epoxide with a phenol, preferably a polyhydric phenol.

In addition to the above described product, which is again an epoxide, another at least one photoinitiator for the cationic curing process and, optionally, further additives which are standard for epoxy resins are, in addition, contained in the epoxy resin.

Cycloaliphatic epoxides are notable for a sufficiently high glass transition temperature and can be produced in electronic quality by epoxidation of corresponding cycloalkenes. Commercial cycloaliphatic epoxides also comprise mixtures of a plurality of different cycloaliphatic epoxides. Suitable compounds have, for example, the following structural formulae:

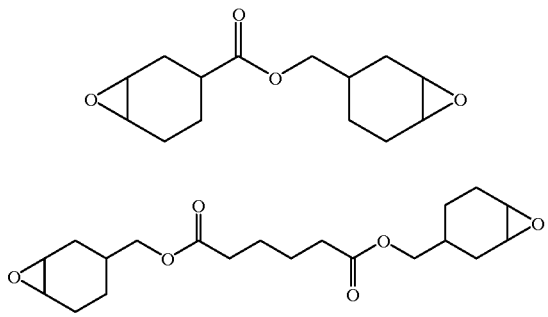

which are also obtainable commercially under the trade names Araldite® CY 179 (Ciba) or ERL 4221 and ERL 4299 (UCC) and CY 177.

A further important constituent of the epoxy resin is the intermediate mentioned, which is obtained, for example, by reacting a cycloaliphatic epoxide with polyphenol, preferably a bisphenol. The choice of the bisphenol is discretionary and, for example, bisphenol A is well suited.

The reaction resulting in the intermediate is carried out by base catalysis under relatively mild conditions. Preferred intermediate is the 2:1 adduct, in which one of each of the two epoxy groups of the two cycloaliphatic diepoxides has reacted in each case with the bisphenol. Accordingly, the 2:1 adduct is also a diepoxide. As a result of 2:1 reaction of the CY 179 already mentioned with bisphenol A, for example, an intermediate having the following formula is essentially obtained:

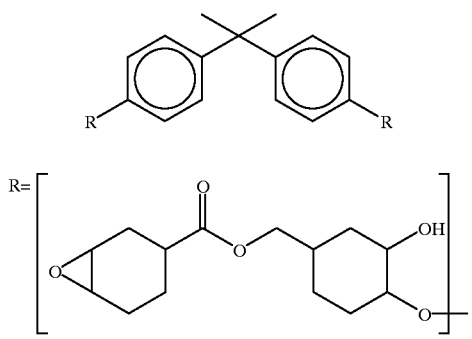

It is also possible, however, to carry out the reaction resulting in the intermediate in a molar ratio of 1:1 to 20:1 and preferably of 1:1 to 5:1. In particular, with a higher proportion of cycloaliphatic epoxide, an increasing proportion of unreacted and therefore unaltered cycloaliphatic epoxide remains in the reaction mixture, in addition to the intermediate (2:1 adduct), after the reaction. If this molar ratio is chosen so as to be sufficiently high, the intermediate containing the cycloaliphatic epoxide (reaction mixture) can be used for the application without further addition of cycloaliphatic epoxide.

A photoinitiator for the cationic curing process is contained as a further indispensable epoxy resin constituent. Its proportion in the total epoxy resin may comprise 0.1 to 5% by weight. During UV irradiation, these photoinitiators release reactive cations, for example protons, which initiate the cationic curing process of the epoxy resin. In this connection, the photoinitiators are derived from stable organic onium salts, in particular with nitrogen, phosphorus, oxygen, sulfur, selenium or iodine as the central atom of the cation. Aromatic sulfonium and iodonium salts having complex anions have proved particularly advantageous. A photoinitiator which releases a Lewis acid and is formed, for example, as a pi-donor transition-metal complex is also possible. Mention may furthermore be made of phenacylsulfonium salts, hydroxyphenylsulfonium salts and sulfoxonium salts. Onium salts which are induced to form acid not directly, but via a sensitizer, can furthermore be used. Organic silicon compounds which release a silanol on UV irradiation in the presence of organoaluminum compounds can also be used as photoinitiators for the cationic curing process.

Well suited as photoinitiator is, for example, the following sulfonium salt. It is a main constituent of Cyracure® UVI 6974 (Union Carbide):

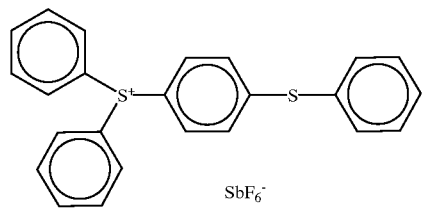

For the purpose of modification, further epoxides may be constituents of the epoxy resin according to the invention or of the epoxy resin for the surface wave component according to the invention. In principle, all those epoxides are suitable which can be obtained by peracid epoxidation. These are, for example, long-chain α-epoxides, epoxidized polybutadiene, epoxidized soya bean oil and a few others.

It is also possible to add further compounds which can be copolymerized with the epoxide. For example, these are some vinyl ethers and alcohols; multifunctional vinyl ethers and alcohols are preferred, preferably multifunctional compounds.

Thus, for example, glycols, further aliphatic diols, trior tetrafunctional alcohols, such as trimethylolpropane or the ethers of glycols with phenols or bisphenols can be added. Further suitable copolymerizable compounds are polymeric polyols, which are used in the production of polyurethanes.

Additionally, nonreactive additives, but additives known for epoxy resins, may be present. These are, in particular, flow control agents, bonding agents, thixotropic agents, thermal curing initiators and, optionally, dyes or pigments. It is particularly emphasized that these are optional constituents which are not necessarily required for the invention. Even without these additives, epoxy resins can be obtained which are suitable for the surface wave component according to the invention.

A preferred thixotropic agent is pyrogenic silicic acid, which may be contained in the epoxy resin in a proportion of up to 15% by weight.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, and in which:

DESCRIPTION OF THE PREFERRED EMBODIMENTS

Figure 1:
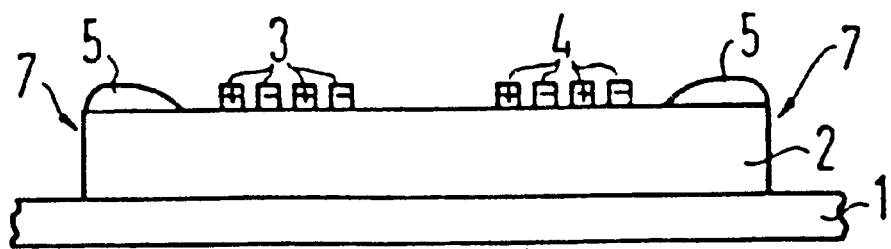
FIG. 1 shows a surface wave component according to the invention in diagrammatic cross section.

The intermediates which are used for the preparation of the screen-printing resins according to the invention are epoxy-functional. An exception is intermediate V3, which is hydroxyl-functional and is synthesized by acid catalysis.

Preparation of a First Prereacted Product V1

300 g of cycloaliphatic diepoxide (Araldite® CY 177, Ciba), together with 15 g of bisphenol A, are introduced into a 500 ml round-bottom flask and stirred at 90° C. until completely dissolved. After adding 1.0 g of basic catalyst, the mixture is heated to 100° C. and left at this temperature for a further 21 hours. The mixture is then degassed for approximately 1 hour at 130° C. in a vacuum of 0.6 mbar. The reaction mixture obtained is ready-to-use intermediate V1.

Preparation of a Second Intermediate V2

150 g of a cycloaliphatic epoxide (Araldite® CY 179), 150 g of a second cycloaliphatic epoxide (Araldite® CY 177) and 30 g of bisphenol A are stirred at 90° in a 500 ml round-bottom flask until the bisphenol is completely dissolved. After adding 1.0 g of catalyst, the mixture is heated to 100° C. and kept at this temperature for 21 hours. The mixture is then degassed at 130° C. under a reduced pressure of 0.6 mbar. The reaction mixture obtained is ready-to-use intermediate V2.

Preparation of a Third Intermediate V3

To prepare the intermediate V3, 23 g of cycloaliphatic epoxide Araldite® CY 179 and 40 g of cycloaliphatic dialcohol (TCD-Alkohol DM, Hoechst, see structural formula) are taken.

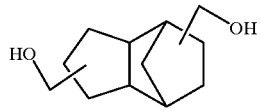

0.05 g of $HSbF_6$. (dissolved in 2 g of TCD-alcohol) are slowly added dropwise while stirring. After a reaction time of several hours, the mixture is heated to 110° C. and stirred for a further hour, and 0.07 g of an aminoethanol is added. A material which is extremely highly viscous at room temperature and which is further processed as intermediate V3 is produced.

Preparation of a Further Intermediate V4 and V5

A further intermediate V4 is prepared in a manner analogous to intermediates V1 and V2 from 100 g of cycloaliphatic epoxide Araldite® CY 179 and 20 g of bisphenol A, while a further intermediate V5 is produced by the same procedure from 100 g of Araldite® CY 179 and 15 g of bisphenol A.

Preparation of a First Screen-printable Epoxy Resin EH 1

20 g of intermediate V1, 50 g of intermediate V2, 0.15 g of defoaming agent (SH, supplied by Wacker), 0.1 g of bonding agent (A 186, supplied by Union Carbide) and 0.5 g of a photoinitiator for the cationic curing process (Cyracure® UVI 6974, Union Carbide) are homogeneously blended by stirring at room temperature. After stirring for 15 minutes, 4.1 g of a first pyrogenic silicic acid (Aerosil® A 380, supplied by Degussa) and 3.0 g of a further pyrogenic silicic acid (Aerosil® R202, supplied by Degussa) are weighed in and the mixture is stirred for a further 30 minutes. After degassing at a pressure of <1 mbar, a ready-to-use epoxy resin EH 1 is obtained which has a viscosity of 42 Pa·s at room temperature.

Preparation of a Second Screen-printable Epoxy Resin EH 2

For this purpose, 88 g of cycloaliphatic epoxide Araldite® CY 179, 150 g of preproduct V3 and 0.75 g of photoinitiator (Cyracure® UVI 6974) are homogeneously blended in a suitable manner and degassed. The ready-to-use epoxy resin mixture EH 2 has a viscosity of 38 Pa·s.

Preparation of a Third Screen-printable Epoxy Resin EH 3

30 g of cycloaliphatic epoxide Araldite® CY 179, 720 g of intermediate V4, 200 g of epoxidized soya bean oil (Edenol D 82, supplied by Henkel), 30 g of pyrogenic silicic acid (Aerosil A 380, supplied by Degussa), 2.5 g of flow control agent (Modaflow, supplied by Monstanto), 1.5 g of a bonding agent (Silan A 186, Union Carbide) and 4.9 g of the photoinitiator UVI 6974 are homogeneously blended and degassed. In this way, a screen-printable epoxy resin having a viscosity of 135 Pa·s is obtained.

Preparation of a Screen-printable Epoxy Resin EH 4

A homogeneous mixture is prepared in an analogous way from 650 g of intermediate V5, 25 g of dodecene oxide (supplied by Peroxid Chemie), 90 g of TCD-Alkohol DM (supplied by Hoechst), 17 g of ethylene glycol (supplied by Merck), 33 g of pyrogenic silicic acid Aerosil A 380 (supplied by Degussa), 2 g of flow control agent (Modaflow, supplied by Monsanto) and 5 g of the photoinitiator UVI 6974 and degassed. The ready-to-use formulation has a viscosity of 21 Pa·s.

The epoxy resins EH 1 to EH 5 thus prepared can now be applied by means of screen printing to a piezoelectric transducer (surface wave component). The viscosity is sufficiently low for the material to be able to pass through the screen used for the printing. At the same time, it is viscous enough not to run through the screen spontaneously. The epoxy resins have sufficient thixotropy for the printed-on structures still to have the desired cross-sectional profile even after a standing time of 1 hour and not to run. Standing times of up to 1 hour must be capable of being maintained so that any air bubbles enclosed in the printed-on structures can escape. The material exhibits a good bonding to the substrate (piezoceramic). It is not sticky enough for it to draw filaments, for instance, during screen printing.

FIG. 1 shows a diagrammatic cross section through a surface wave component 7 (surface wave filter) on which attenuating structures 5 were already printed as described. The substrate 2 comprises a piezoceramic (for example lithium niobate) approximately 500 μm thick and is glued over its entire underside to a copper trough 1.

On the upper side of the substrate 2, there are the transducer electrodes 3 and 4. The figure shows a section through the "teeth" of the transducer electrodes 3, 4, which are of comb-like structure, the teeth of two of the comb-like transducer electrodes having different polarity (denoted by + and −) being inserted into one another in each case. Thus, the transducer electrodes 3, for example, form a surface wave transmitter which converts the electrical signal applied to the transducer electrodes 3 into mechanical signals or vibration signals, the so-called surface waves. The transducer electrodes 4 are the surface wave receiver. This converts the surface waves filtered by means of the component back into electrical signals. The attenuating structures 5 are applied outside the active transducer region by screen printing. As is evident in the figure, the resin is applied for example to two mutually opposite edges on the surface of the substrate in the direction of propagation of the surface waves. However, all the edges of the surface of the substrate may also be occupied by epoxy resin or by attenuating structures. Clearly recognizable, despite the diagram not being true to scale, are the shallow gradients of the resin structures which additionally suppress reflections of the surface waves from the screen-printed edge since the transition of the wave from the substrate 2 to the attenuating structures 5 is thereby facilitated.

After the holding time mentioned, the components so coated are subjected to UV irradiation. The components are irradiated for approximately 1 minute with an irradiation intensity of approximately 50 mW·cm$^{-2}$ in the UV-A range.

The attenuating structures are now sufficiently cured to carry out, if necessary, a sawing process to separate the surface wave components from the wafer. This process does not result either in detachment of or damage to the attenuating structures. At any desired later instant in time, optionally also prior to sawing, the components or the attenuating structures are postcured for a few minutes, for example, at 130° C.

The finished components are subjected to a corrosion test at 110° C. (moisture and direct voltage). In the case of the tested components, no failures due to corrosion or other failures are observed. In addition, the attenuation (in dB) achieved according to the invention of the surface wave filters is determined in the function test.

In the table below, a few measurements of the epoxy resins prepared in the illustrative examples and of the surface wave filter coated therewith are given. The glass transition temperatures Tg are determined by DSC.

| Resin | Viscosity [Pa · s] | Tg [° C.] | Attenuation [dB] |
|---|---|---|---|
| EH 1 | 42 | 125 | 54 |
| EH 2 | 28 | 123 | 55 |
| EH 3 | 135 | 133 | 54 |
| EH 4 | 21 | 120 | 53 |

It emerges that the attenuation behavior of the surface wave components coated according to the invention with UV-curable epoxy resins meets the requirements.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for producing an acoustic attenuating structure on a surface wave component comprising the steps of:

printing an epoxy resin which cationically cures with UV initiation, the epoxy resin forming an acoustic attenuating structure on a surface of the surface wave component;

maintaining a holding time in a range of 0 minutes to 60 minutes; and curing the epoxy resin by exposing the resin structure to UV radiation;

using an epoxy resin which has the following constituents:

cycloaliphatic epoxide;

a product of a reaction of cycloaliphatic epoxide and a polyhydric phenol in a molar ratio of the reactive groups of 1:1 to 20:1; and a photoinitiator for cationic curing.

2. The method as claimed in claim 1 wherein the epoxy resin has a viscosity of 20–150 Pa·s.

3. The method as claimed in claim 1, wherein the cycloaliphatic epoxide is selected from 3,4-epoxycyclohexylmethyl 3',4'-epoxycyclohexanecarboxylate and bis(3,4-epoxycyclohexylmethyl)adipate or a mixture thereof.

4. The method as claimed in claim 1, wherein the epoxy resin contains further constituents which are reactive with regard to the UV-initiated cationic curing process and which are selected from aliphatic epoxides and mono- or multifunctional aliphatic and araliphatic alcohols and vinyl ethers.

5. The method as claimed in claim 1, wherein the epoxy resin further has additives which are standard for epoxy resins and which are selected from flow control agents, bonding agents, thixotropic agents and thermal curing initiators.

6. The method as claimed in claim 1, wherein a plurality of components is produced on a wafer and wherein, after the curing of the resin structure, a sawing process is carried out through parts of the structure to separate the components.

7. A method for producing an acoustic attenuating structure on a surface wave component, comprising the steps of:

printing an epoxy resin which cationically cures with UV initiation, the epoxy resin forming an acoustic attenuating structure on a surface of the surface wave component;

maintaining a holding time of up to 60 minutes;

curing the epoxy resin by exposing the resin structure to UV radiation;

using an epoxy resin which has the following constituents:

cycloaliphatic epoxide; a product of a reaction of cycloaliphatic epoxide and a polyhydric phenol in a molar ratio of the reactive groups of 1:1 to 20:1;

a photoinitiator for the cationic curing process and;

further additives which are standard for epoxy resins.

8. The method as claimed in claim 7, wherein the epoxy resin has a viscosity of 20–150 Pa·s.

9. The method as claimed in claim 7, wherein the cycloaliphatic epoxide is selected from 3,4-epoxycyclohexylmethyl 3',4'-epoxycyclohexanecarboxylate and bis (3,4-epoxycyclohexylmethyl) adipate or a mixture thereof.

10. The method as claimed in claim 7, wherein the epoxy resin contains further constituents which are reactive with regard to the UV-initiated cationic curing process and which are selected from aliphatic epoxides and mono- or multi-functional aliphatic and araliphatic alcohols and vinyl ethers.

11. The method as claimed in claim 7, wherein the additives which are standard for epoxy resins are selected from flow control agents, bonding agents, thixotropic agents and thermal curing initiators.

* * * * *